(12) United States Patent
Choi et al.

(10) Patent No.: US 8,573,634 B2
(45) Date of Patent: Nov. 5, 2013

(54) CENTER CURTAIN AIR BAG APPARATUS FOR VEHICLE

(75) Inventors: Jun Yeol Choi, Seoul (KR); Dae Young Kwak, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/472,026

(22) Filed: May 15, 2012

(65) Prior Publication Data

US 2013/0069348 A1 Mar. 21, 2013

(30) Foreign Application Priority Data

Sep. 21, 2011 (KR) .................. 10-2011-0095037

(51) Int. Cl.
*B60R 21/214* (2011.01)
*B60R 21/232* (2011.01)

(52) U.S. Cl.
USPC ..................... 280/730.1; 280/730.2

(58) Field of Classification Search
CPC .. B60R 21/213; B60R 21/214; B60R 21/232; B60R 21/233; B60R 2021/23192
USPC ................. 280/729, 730.1, 730.2, 743.1, 749
See application file for complete search history.

(56) References Cited

U.S. PATENT DOCUMENTS

| | | | | |
|---|---|---|---|---|
| 3,606,377 A | * | 9/1971 | Martin | 280/741 |
| 3,650,542 A | * | 3/1972 | Shimano et al. | 280/749 |
| 3,733,088 A | * | 5/1973 | Stephenson | 280/730.1 |
| 3,774,936 A | * | 11/1973 | Barnett et al. | 280/730.1 |
| 5,186,492 A | * | 2/1993 | Wright et al. | 280/728.2 |
| 5,195,775 A | * | 3/1993 | Komerska et al. | 280/732 |
| 5,255,937 A | * | 10/1993 | EmamBakhsh et al. | 280/728.1 |
| 5,470,103 A | * | 11/1995 | Vaillancourt et al. | 280/730.1 |
| 5,560,644 A | * | 10/1996 | Fiore | 280/728.2 |
| 5,607,179 A | * | 3/1997 | Lenart et al. | 280/728.2 |
| 6,283,500 B1 | * | 9/2001 | Eckert et al. | 280/730.1 |
| 6,457,740 B1 | * | 10/2002 | Vaidyaraman et al. | 280/730.2 |
| 6,648,367 B2 | * | 11/2003 | Breed et al. | 280/730.1 |
| 6,672,619 B1 | * | 1/2004 | Ennerdal et al. | 280/749 |
| 7,125,069 B2 | * | 10/2006 | Cacucci et al. | 296/190.03 |
| 7,195,276 B2 | * | 3/2007 | Higuchi | 280/730.1 |
| 7,461,858 B2 | * | 12/2008 | Hirata | 280/730.2 |
| 7,862,074 B2 | * | 1/2011 | Deng et al. | 280/730.1 |
| 7,926,840 B1 | * | 4/2011 | Choi | 280/730.1 |
| 8,393,637 B2 | * | 3/2013 | Choi et al. | 280/730.1 |
| 2004/0066022 A1 | * | 4/2004 | Mori et al. | 280/730.1 |
| 2004/0239083 A1 | * | 12/2004 | Mori et al. | 280/730.1 |
| 2004/0239084 A1 | * | 12/2004 | Mori et al. | 280/730.1 |
| 2005/0082797 A1 | * | 4/2005 | Welford et al. | 280/730.2 |
| 2006/0175814 A1 | * | 8/2006 | Jang et al. | 280/730.2 |
| 2010/0140909 A1 | * | 6/2010 | Jang | 280/743.1 |
| 2012/0133114 A1 | * | 5/2012 | Choi et al. | 280/728.2 |

FOREIGN PATENT DOCUMENTS

JP 2008-284904 A 11/2008

OTHER PUBLICATIONS

Adhere Definition, Merriam-Webster's Online Dictionary, available at http://www.merriam-webster.com/dictionary/adhere (last visited on Mar. 22, 2013).*
Adjacent Definition, Merriam-Webster's Online Dictionary, available at http://www.merriam-webster.com/dictionary/adjacent (last visited Mar. 23, 2013).*

* cited by examiner

*Primary Examiner* — Joseph Rocca
(74) *Attorney, Agent, or Firm* — Morgan, Lewis & Bockius LLP

(57) ABSTRACT

A center curtain air bag apparatus for a vehicle efficiently protects a rear seat passenger with an air bag cushion that is deployed during a car collision accident.

10 Claims, 10 Drawing Sheets

(A)

(B)

(A)

(B)

(A)

(B)

(A)

(B)

(A)

(B)

CENTER CURTAIN AIR BAG APPARATUS FOR VEHICLE

CROSS-REFERENCE TO RELATED APPLICATION

The present application claims priority of Korean Patent Application Number 10-2011-0095037 filed Sep. 21, 2011, the entire contents of which application is incorporated herein for all purposes by this reference.

BACKGROUND OF INVENTION

1. Field of Invention

The present invention relates to a center curtain air bag apparatus for a vehicle, and more particularly, to a center curtain air bag apparatus for protecting a rear seat passenger when a car collision accident happens.

2. Description of Related Art

Generally, an indoor space of a car may be configured as a combined single space of a front space 2 for a front seat passenger 1 and a rear space 4 for a rear seat passenger 3, as shown in FIG. 1.

As a result, when a car collision accident happens while the rear seat passenger 3 does not put on a safety belt, the rear seat passenger 3 may be moved to a front part of a car due to an inertial force and then collide with the front seat passenger 1, or with car interior materials such as a dash panel 5 or a front glass 6, as shown in FIG. 2, thereby aggravating a passenger injury.

In a part of cars such as a high class car or a limousine, a device for separating the front space 2 and the rear space 4, if necessary, may be provided, however, the device does not sufficiently protect a rear seat passenger when a car collision accident happens.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to solve the above-described problems associated with the prior art, and to provide a center curtain air bag apparatus through which a combined interior space of a car is divided into a front space and a rear space when a car collision accident happens, and at the same time a rear seat passenger can be protected efficiently.

Various aspects of the present invention provide for a center curtain air bag apparatus for a vehicle according to the present invention includes an air bag housing which is installed to be adhered closely to a roof panel in a left and right direction of a car body, between a front seat and a rear seat, an inflator which is fixed into the air bag housing and produces air bag gas through an explosive operation by a control signal from an air bag ECU, and an air bag cushion, an upper end of which is fixed to the air bag housing and comprises a chamber divided into a plurality thereof wherein the air bag cushion is folded to be adhered closely to the air bag housing and then is deployed toward a floor panel by a pressure produced when the inflator is exploded.

The center curtain air bag apparatus may include a diffuser which is fixed into the air bag housing, together with the inflator, and dividedly supplies the air bag gas coming from the inflator into the respective chambers of the air bag cushion, and a pair of support panels which are connected to both sides of the air bag cushion and a center pillar to minimize a movement of the air bag cushion when a pressure is applied to the air bag cushion.

The air bag cushion may be connected integrally to a curtain air bag so that a movement of the air bag cushion is minimized when a pressure is applied to the deployed air bag cushion.

Both ends of the air bag housing may be fixed through a support bracket to an edge of a car body panel, to which the roof panel and a side panel are connected.

A retainer covered by the air bag cushion may be provided on an upper end of the air bag cushion, and the air bag housing, the air bag cushion and the retainer are connected integrally through a plurality of pins.

The chamber may be divided by a plurality of needle lines sewn vertically wherein the chamber has the same upper end interval as the lower end interval.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
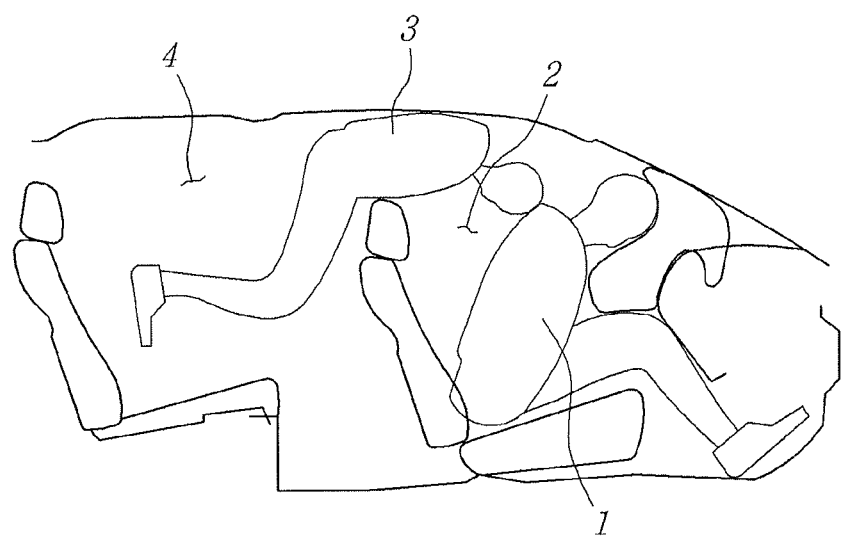
FIGS. 1 and 2 are cross-sectional views showing an interior space of a conventional vehicle.
Figure 2:
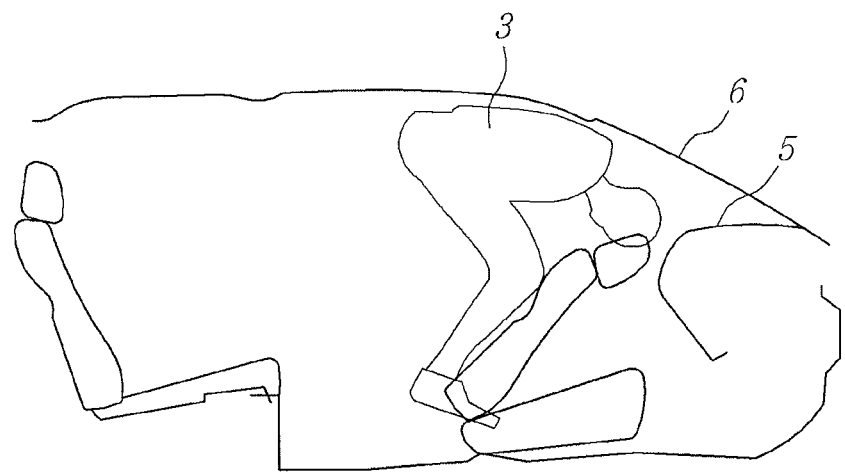

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 3:
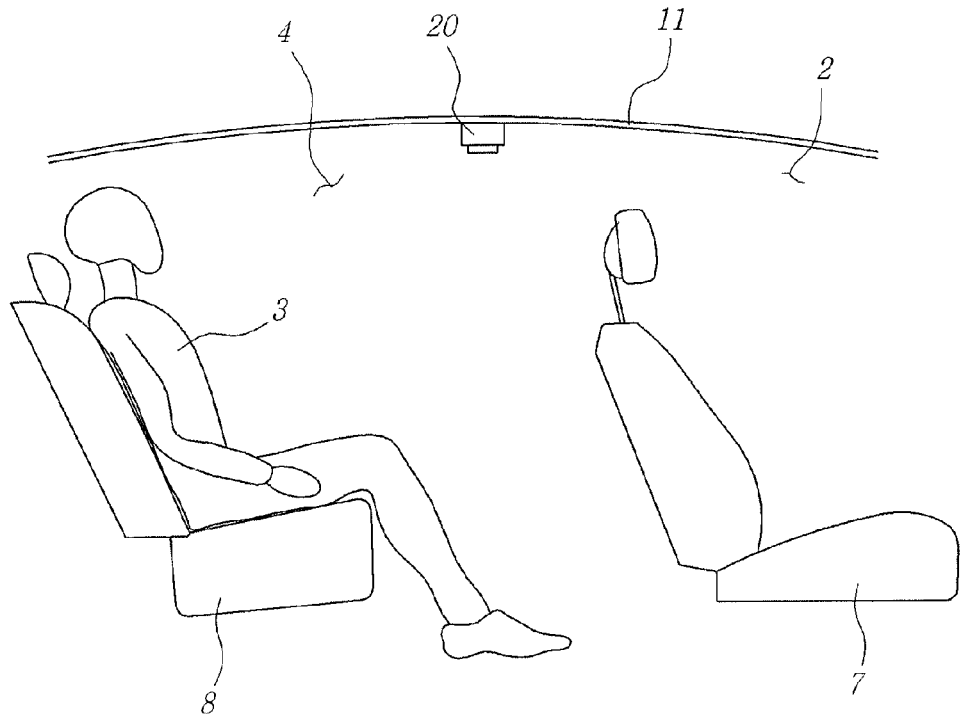
FIG. 3 is a cross-sectional view showing an exemplary interior space of a car provided with a center curtain air bag apparatus according to the present invention.
Figure 4:
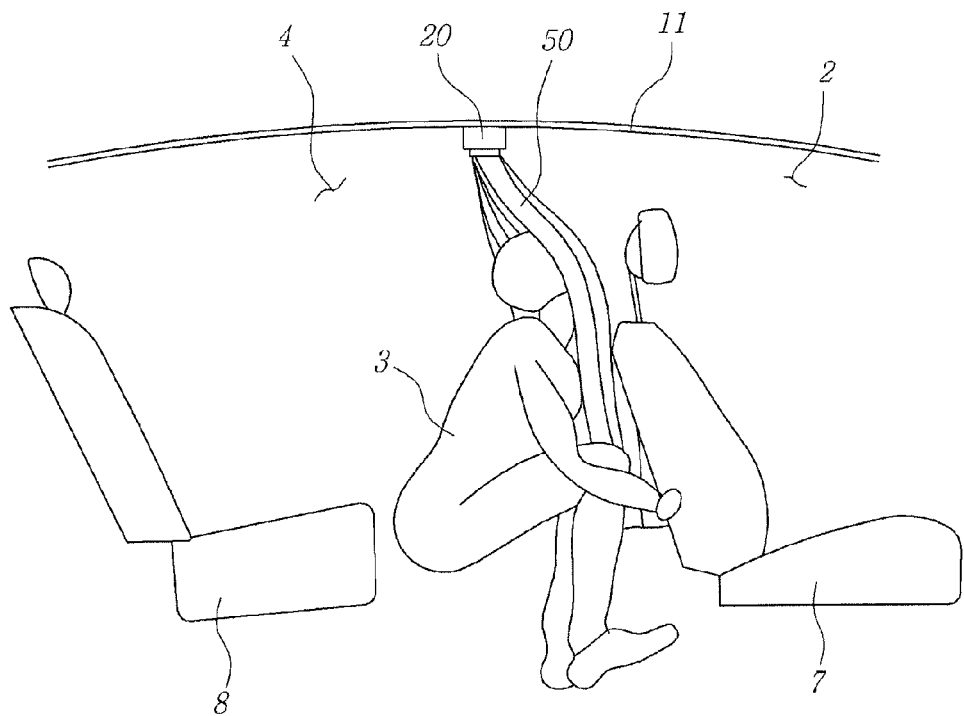
FIG. 4 is a cross-sectional view showing an operation state of an exemplary center curtain air bag apparatus according to the present invention.
Figure 5:
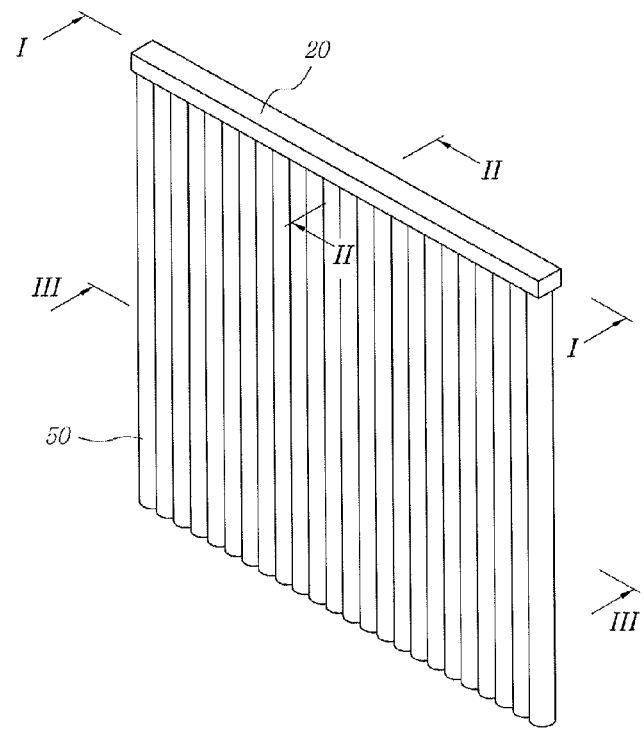
FIG. 5 is a perspective view showing an exemplary center curtain air bag apparatus according to the present invention.
Figure 6:
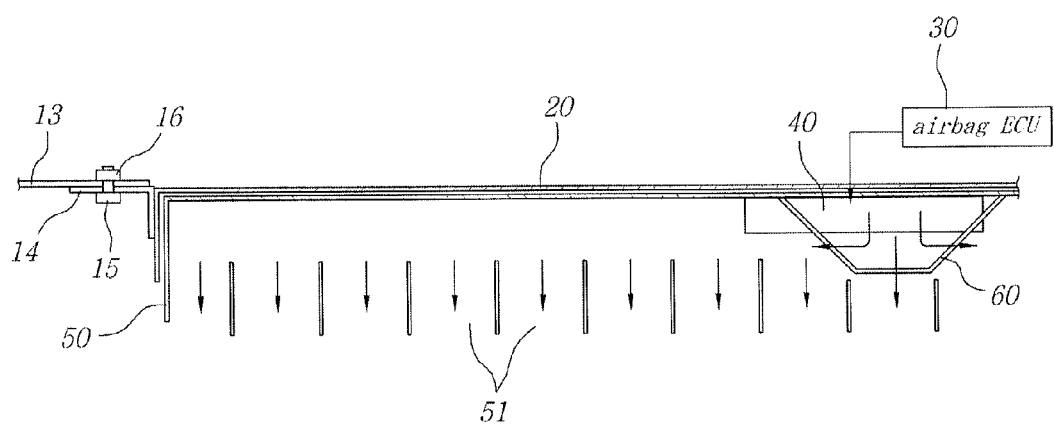
FIGS. 6-8 are cross-sectional views taken along lines I-I, II-II and III-III, respectively, in FIG. 5.
Figure 7:
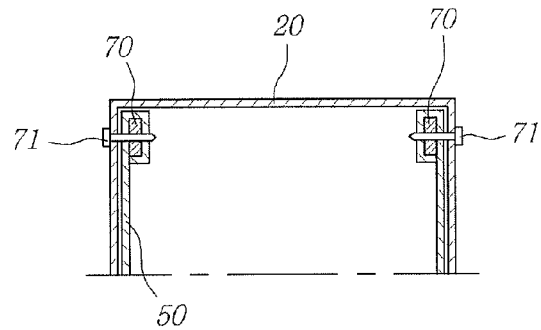
Figure 8:
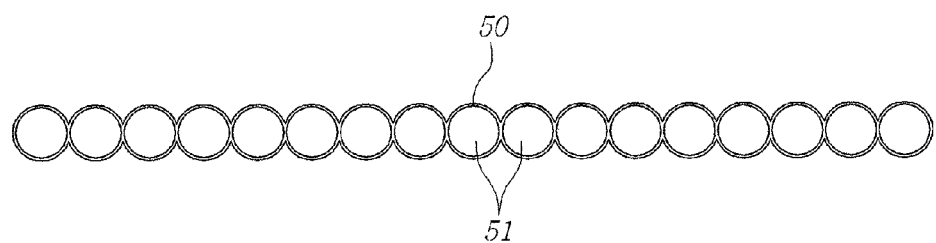
Figure 9:
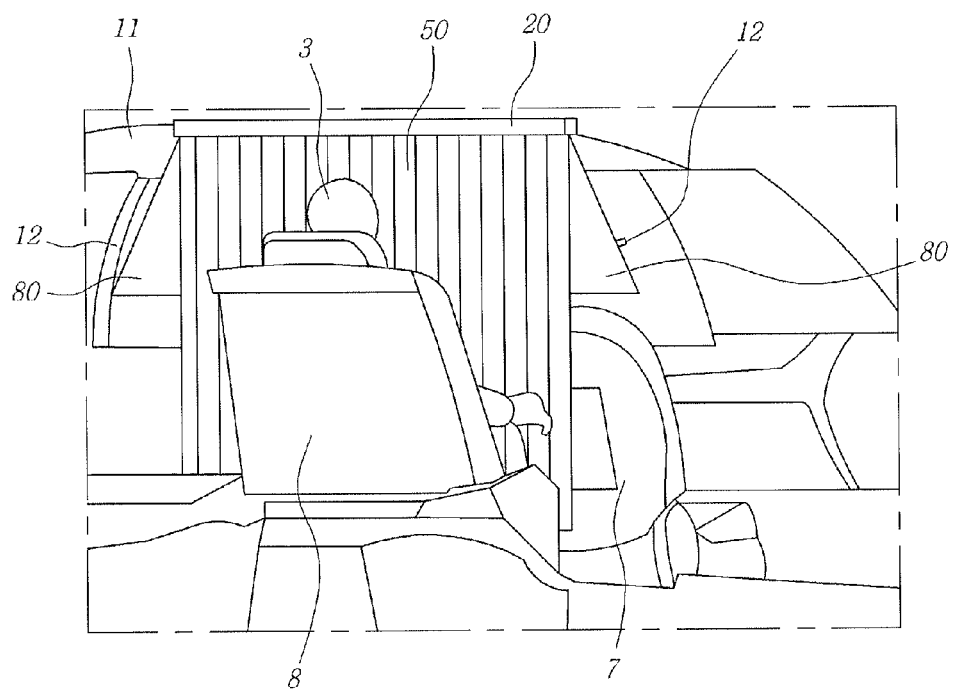
FIG. 9 is a cross-sectional view showing an exemplary support panel connected to an air bag cushion.
Figure 10:
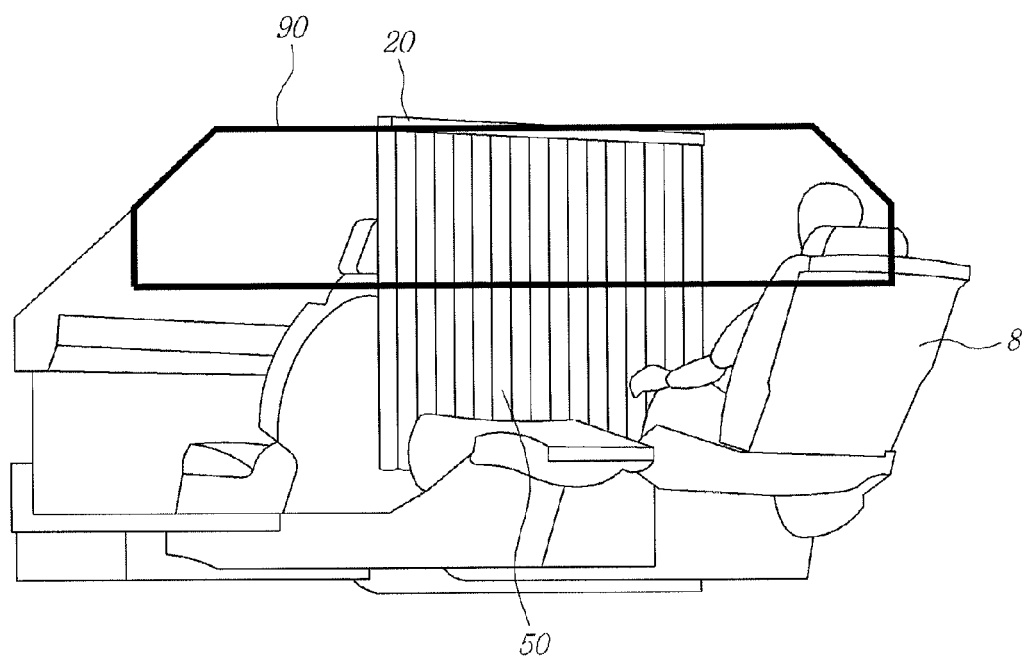
FIG. 10 is a cross-sectional view showing an exemplary curtain air bag connected to the air bag cushion.

A center curtain air bag apparatus for a vehicle according to the present invention is configured such that when a car accident does not happen on an ordinary day, the center curtain air bag allows an interior space of a car to be a combined single space, as shown in FIG. 3, and when a car accident happens, a front space 2 in which a front seat 7 is disposed and a rear space 4 in which a rear seat 8 is disposed are to be separated by a deployed air bag cushion 50, as shown in FIG. 4, and thus a rear seat passenger 3 may be protected by the deployed air bag cushion 50, thereby minimizing a passenger injury.

That is, a center curtain air bag apparatus according to the present invention, as shown in FIGS. 3-10, may include an air bag housing 20 which is fixed left-rightward to a roof panel 11 of a car between a front seat 7 and a rear seat 8, an inflator which is fixed into the air bag housing 20 and generates air bag gas through an explosive operation by a control signal from an air bag ECU 30, an air bag cushion 50 an upper end of which is fixed to the air bag housing 20, which includes a plurality of chambers, and which is folded to adhere closely to the air bag housing 20 and deployed downwardly toward a floor panel by an air bag gas pressure caused from an explosive operation of the inflator 40, and a diffuser 60 which is fixed into the air bag housing 20, together with the inflator 40, and dividedly supplies an air bag gas generated from the inflator 40 into the respective chambers 51 of the air bag cushion 50.

Herein, both ends of the air bag housing 20, which are disposed left-rightward based on a car body, are fixed to a car body panel 13 wherein a support bracket 14 is welded integrally to the air bag housing 20 and the support bracket 14 is connected to the car body panel 13.

The car body panel 13 is an edge panel connecting a roof panel 11 and a side panel and devices for connecting the support bracket 14 and the car body panel 13 may be a bolt 15 and a nut 16, but the devices are not limited thereto.

The air bag housing 20 may be connected directly to the roof panel 11, however, in this case, appearance beauty may be damaged due to an exposure of a welding part or a connection member into an interior of a car and further when a separate member is used to avoid the exposure of the welding part or the connecting member, the number of parts is increased to raise costs.

However, in a case where both ends of the air bag housing 20 are connected to an edge of the car body panel 13 connecting the roof panel 11 and a side panel, using the support bracket 14, the bolt 15 and the nut 16, connecting parts are not exposed to an interior of a car, thereby not damaging appearance beauty. Specially, a connecting strength may be increased through using the support bracket 14 and thus an air bag housing disconnection caused from an explosive force from the inflator 40 may be avoided.

A retainer 70 may be provided on an upper end of the air bag cushion 50 to be surrounded thereby and further the air bag housing 20, the air bag cushion 50 and the retainer 70 may be connected integrally through a plurality of connecting pins 71.

The retainer 70 serves to further increase a connecting force of the air bag housing 20 and the air bag cushion 50.

Furthermore, in accordance with various embodiments of the present invention, a pair of support panels 80 may be further provided to be connected to both side surfaces of the air bag cushion 50 and a center pillar 12 in order to minimize a movement of the air bag cushion 50 and sufficiently protect a rear seat passenger 30 when the air bag cushion 50 is deployed and a rear seat passenger 30 contacts the deployed air bag cushion 50 and thus a predetermined pressure is applied to the air bag cushion 50.

On an ordinary day when a car accident does not happen, the support panel 80 is disposed in the center pillar 12 not to be exposed outside and when the air bag cushion 50 is deployed when a car accident happens, the support panel 80 may tear through a tear line formed in the center pillar 12 to protrude into an interior of a car wherein the support panel 80 may be foldable such as a bellows.

Further, in accordance with various embodiments of the present invention, the air bag cushion 50 may be connected integrally with a curtain air bag 90 to minimize a movement of the air bag cushion 50

The curtain air bag 90 may be replaced with the support panel 80, or added to the support panel 80.

Meanwhile, FIGS. 11-15 show various embodiments of the air bag cushion 50 according to the present invention wherein each drawing (A) shows a state where an air bag gas is not injected in the chamber 51 of the air bag cushion 50, and each drawing (B) shows a state where an air bag gas is injected in the chamber 51 of the air bag cushion 50.

Figure 11:
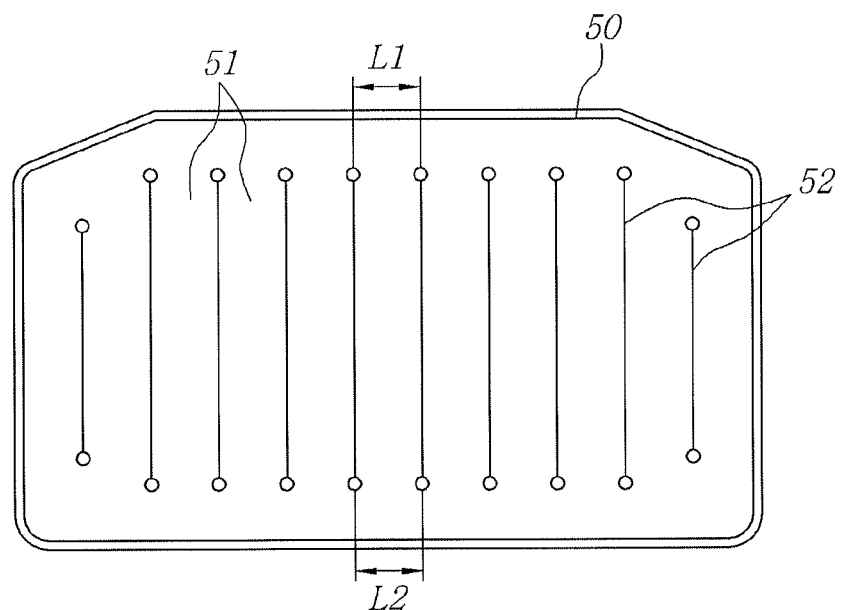
FIGS. 11-15 are views showing an exemplary air bag cushion in accordance with various embodiments of the present invention.
Figure 11:
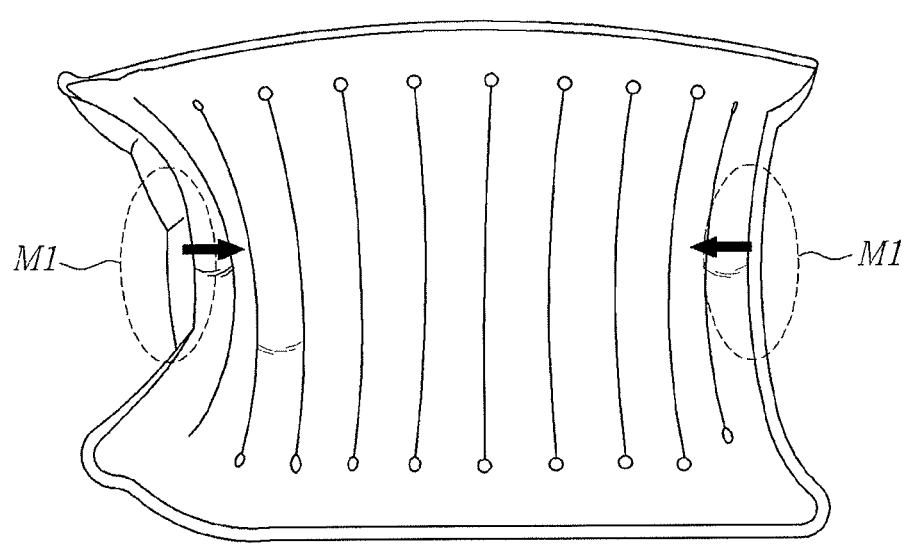

The air bag cushion 50 shown in FIG. 11 may be configured such that a plurality of chambers 51, which are arranged laterally, are formed by dividing the air bag cushion through a plurality of needle lines 52 sewn vertically. A chamber 51 may have the same upper end interval L1 as the lower end interval L2.

As shown in FIG. 11, when an air bag gas is injected into the air bag cushion 50 in which the plurality of chambers 51 are formed, the left and right portions M1 of the air bag cushion retract toward a center of a middle part as shown in the drawing (B), thereby surrounding and protecting upper body parts of passengers 3 who are seated on the left and right parts of a rear seat 8, respectively.

Figure 12:
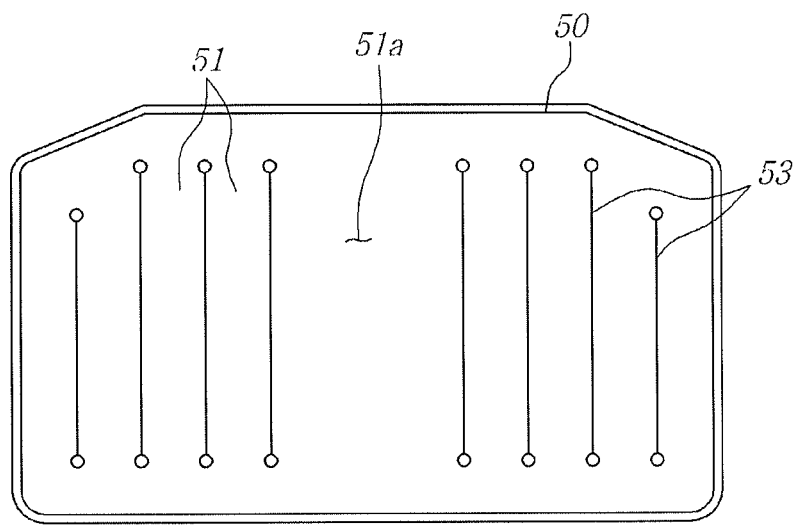
Figure 12:
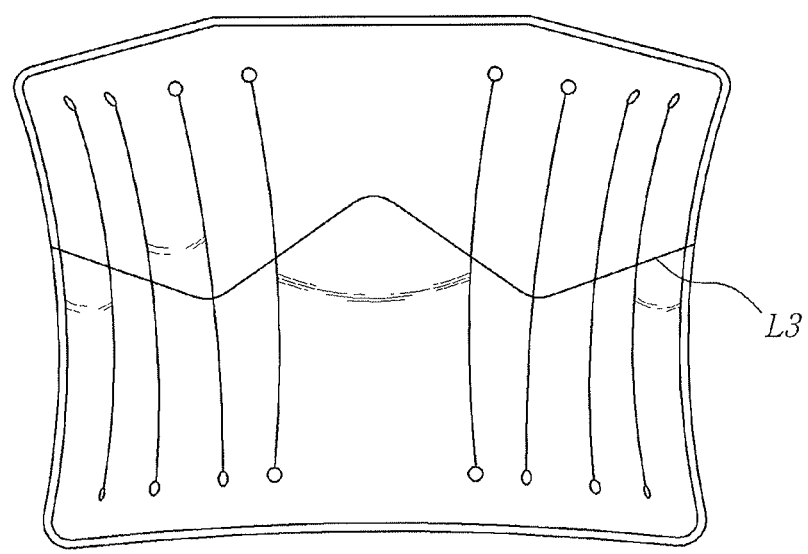

The air bag cushion 50 as shown in FIG. 12 may be configured such that a plurality of chambers 51, which are arranged laterally, are formed by dividing the air bag cushion through a plurality of needle lines 53 sewn vertically wherein a middle chamber 51a of the air bag cushion 50 may have a wider space than those of left and right chambers 51.

As shown in FIG. 12, in a case of a middle chamber 51a of the air bag cushion 50 having a wider space than that of left and right chambers 51, when a air bag gas is injected into the air bag cushion, as indicated through a solid line L3 in the drawing (B), the left and right portions of the air bag cushion 50 and a middle part in which the chamber 51 having a wide space is placed are swollen and further the portions between the left portion of the air bag cushion 50 and the middle chamber 51a, and between the right portion of the air bag cushion 50 and the middle chamber 51a are dented, thereby surrounding and efficiently protecting an upper body part of a rear seat passenger 3 with respect to an offset collision.

Figure 13:
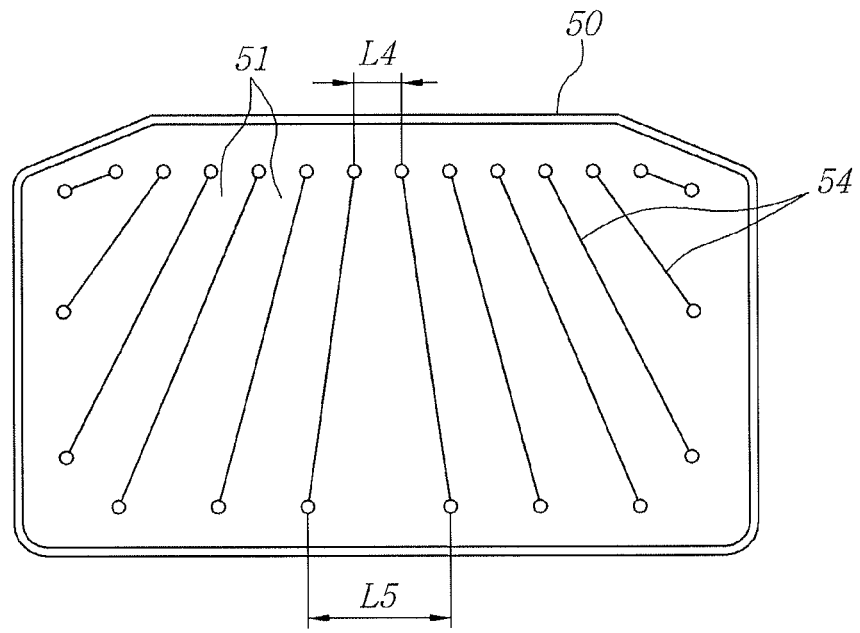
Figure 13:
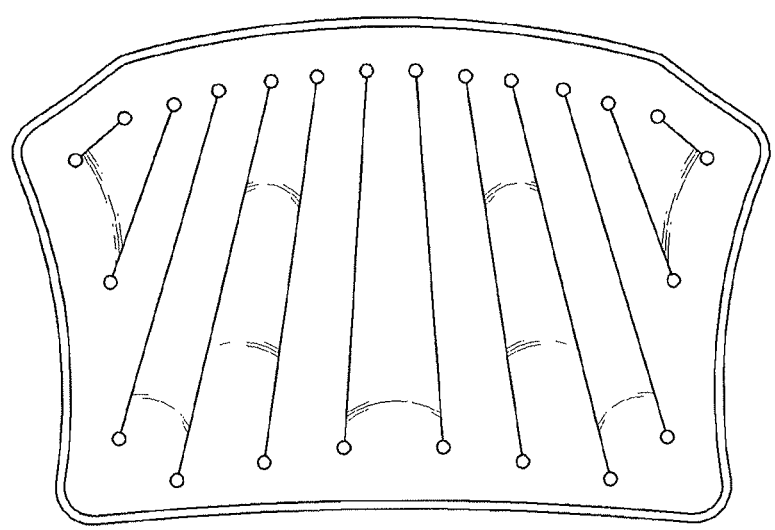

The air bag cushion 50 shown in FIG. 13 may be configured such that a plurality of chambers 51, which are arranged laterally, are formed by dividing the air bag cushion through a plurality of needle lines 52 sewn vertically wherein a chamber 51 may be formed such that the upper end interval L4 is narrower than that of the lower end interval L5.

That is, the respective chamber 51 as shown in FIG. 13 may be formed in a shape of a ladder which has a narrow upper part and a wide lower part.

As shown in FIG. 13, when an air bag gas is injected into the air bag cushion 50 in which the plurality of chambers 51 are formed, the left and right portions of the air bag cushion 50 do not retract toward a center of a middle part as shown in the drawing (B), and thus the air bag cushion 50 can ensure the widest area and protect an upper body part of a rear seat passenger 3.

Figure 14:
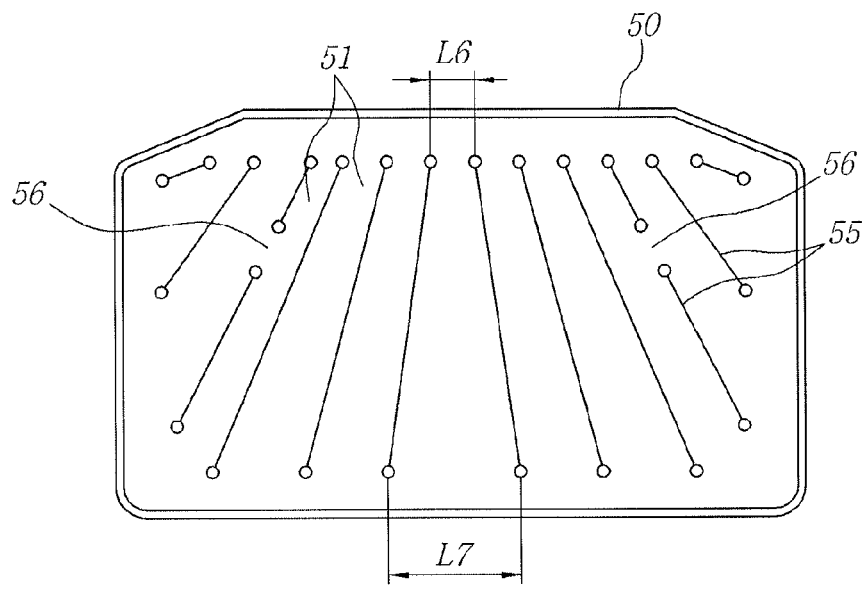
Figure 14:
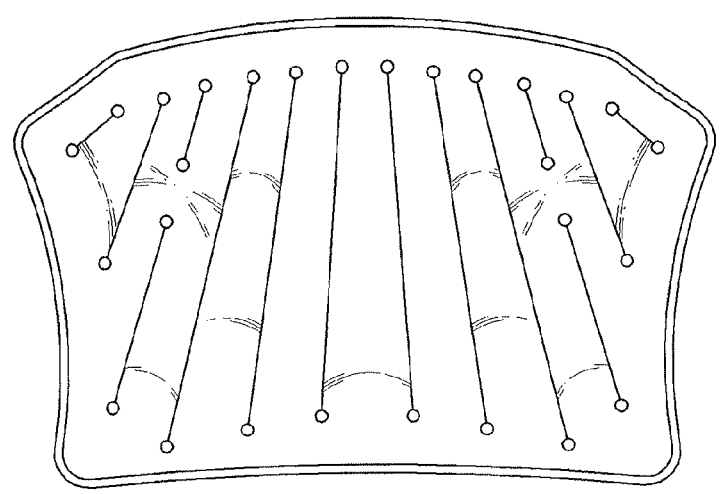

The air bag cushion 50 shown in FIG. 14 may be configured such that a plurality of chambers 51, which are arranged laterally, are formed by dividing the air bag cushion through a plurality of needle lines 52 sewn vertically wherein a chamber 51 may be formed such that the upper end interval L6 is narrower than that of the lower end interval L7, and the chamber 51 disposed on a left upper end of the air bag cushion 50 and the chamber 51 disposed on a right upper end of the air bag cushion 50, which are adjacent to each other, may be communicated through a connection passage 56.

That is, the respective chamber 51 as shown in FIG. 14 may be formed in a shape of a ladder which has a narrow upper part and a wide lower part.

As shown in FIG. 14, when an air bag gas in injected into the air bag cushion 50 in which the plurality of chambers 51 are formed, the same effect as in FIG. 13 is obtained and the connection passage 56 may be swollen further.

The connection passages 56 disposed on the left and right ends of the air bag cushion 50 correspond to the heads of passengers who are seated on the left and right parts of the rear seat 8, respectively and when the connection passage 56 is swollen further, the head of the rear seat passenger 3 can be protected more efficiently.

Figure 15:
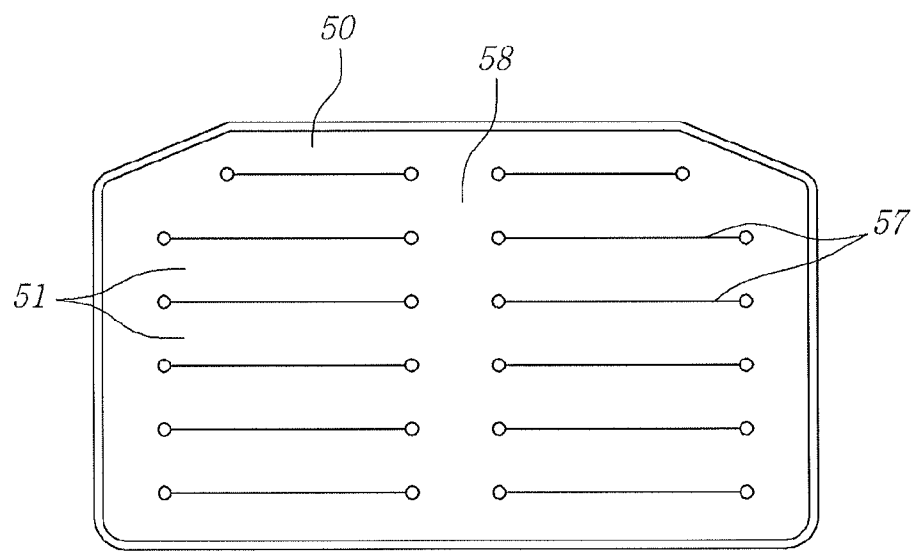
Figure 15:
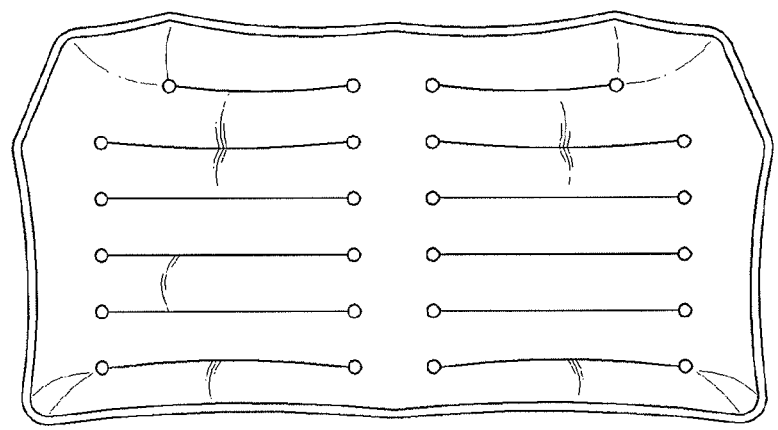

The air bag cushion 50 shown in FIG. 15 may be configured such that a plurality of chambers 51, which are arranged laterally, are formed by dividing the air bag cushion through a plurality of needle lines 57 sewn vertically, and the chambers 51 may be communicated through a middle passage 58 formed on a middle part of the air bag cushion 50.

As shown in FIG. 15, when an air bag gas is injected into the air bag cushion 50 in which the plurality of chambers 51 are formed, the left and right portions of the air bag cushion 50 do not retract toward a center of a middle part as shown in the drawing (B), and thus the air bag cushion 50 can ensure the widest area both left and rightward and protect a widest range both left and rightward in an upper body part of a rear seat passenger 3.

As described above, according to a center curtain air bag apparatus according to the present invention, the air bag cushion 50 may be deployed to be divided into a front space 2 in which a front seat 7 is disposed and a rear space 4 in which a rear seat 8 is disposed, and at the same time an upper body of a rear seat passenger 3 moving toward a front side of a car due to an inertial force can be efficiently protected through the deployed air bag cushion 50 and thus the passenger can be protected efficiently.

In accordance with the present invention providing a center curtain air bag apparatus, an air bag is deployed to be divided into a front space in which a front seat is disposed and a rear space in which a rear seat is disposed, and at the same time an upper body of a rear seat passenger moving forwardly due to an inertia force can be protected by the deployed air bag cushion, thereby efficiently protecting the passenger.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A center curtain air bag apparatus for a vehicle, comprising:
an air bag housing installed to folded and stored along a roof panel in a left and right direction of a car body, between a front seat and a rear seat;
an inflator fixed to the air bag housing that generates air bag gas by an explosive operation by a control signal from an air bag ECU; and
an air bag cushion including an upper end fixed to the air bag housing and a plurality of chambers, wherein the air bag cushion is folded to be adhered closely to the air bag housing and then is deployed downward toward a floor panel by a pressure produced when the inflator is exploded;
wherein the airbag cushion is connected to an intermediate portion of a side curtain airbag so that movement of the air bag cushion in a traverse direction of the vehicle is minimized when a pressure is applied to the air bag cushion.

2. The apparatus of claim 1, further comprising a diffuser fixed within the air bag housing, together with the inflator, and dividedly supplies the air bag gas coming from the inflator into respective chambers of the air bag cushion.

3. The apparatus of claim 1, further comprising a pair of support panels connected to both sides of the air bag cushion and a center pillar to minimize a movement of the air bag cushion when a pressure is applied to the air bag cushion.

4. The apparatus of claim 1, wherein both ends of the air bag housing are fixed by a support bracket to an edge of a car body panel, to which the roof panel and a side panel are connected.

5. The apparatus of claim 1, wherein a retainer covered by the air bag cushion is provided on an upper end of the air bag cushion, and the air bag housing, the air bag cushion and the retainer are connected by a plurality of connecting pins.

6. The apparatus of claim 1, wherein the air bag cushion is divided into the plurality of chambers by a plurality of needle lines sewn vertically wherein the chamber has the same upper end interval L1 as the lower end interval L2.

7. The apparatus of claim 1, wherein the air bag cushion is divided into the plurality of chambers by a plurality of needle lines sewn vertically wherein a middle chamber of the air bag cushion has a wider space than those of left and right chambers.

8. The apparatus of claim 1, wherein the air bag cushion is divided into the plurality of chambers by a plurality of needle lines sewn vertically wherein the upper end interval L4 of the chamber is narrower than that of the lower end interval L5.

9. The apparatus of claim 1, wherein the air bag cushion is divided into the plurality of chambers by a plurality of needle lines sewn vertically wherein the upper end interval L6 of the chamber is narrower than that of the lower end interval L7, and the chamber disposed on a left upper end of the air bag cushion and the chamber disposed on a right upper end of the air bag cushion communicate through a connection passage.

10. The apparatus of claim 1, wherein the air bag cushion is divided into the plurality of chambers by a plurality of needle lines sewn vertically spaced from one another wherein the chambers are communicated through a middle passage 58 formed on a middle part of the air bag cushion.

* * * * *